United States Patent
Lee et al.

(10) Patent No.: US 8,751,189 B2
(45) Date of Patent: Jun. 10, 2014

(54) ELECTRONIC DEVICE AND DISPLAY ADJUSTMENT METHOD

(75) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 284 days.

(21) Appl. No.: 13/213,098

(22) Filed: Aug. 19, 2011

(65) Prior Publication Data

US 2012/0310588 A1 Dec. 6, 2012

(30) Foreign Application Priority Data

May 31, 2011 (TW) .............................. 100118940 A

(51) Int. Cl.
G06F 15/00 (2006.01)

(52) U.S. Cl.
USPC ........... 702/141; 345/157; 345/173; 345/619; 345/649; 715/230; 715/232

(58) Field of Classification Search
USPC .......... 702/141; 345/156, 157, 158, 173, 619, 345/649, 660; 715/230, 232, 764
See application file for complete search history.

(56) References Cited

U.S. PATENT DOCUMENTS

| 7,193,609 | B2 * | 3/2007 | Lira | 345/157 |
|---|---|---|---|---|
| 7,872,640 | B2 * | 1/2011 | Lira | 345/173 |
| 8,379,059 | B2 * | 2/2013 | Shih et al. | 345/649 |
| 8,441,441 | B2 * | 5/2013 | Tsai et al. | 345/157 |
| 8,499,234 | B2 * | 7/2013 | Sawada et al. | 715/230 |
| 2010/0174421 | A1 * | 7/2010 | Tsai et al. | 700/302 |
| 2010/0225664 | A1 * | 9/2010 | Ogasawara | 345/619 |
| 2013/0120301 | A1 * | 5/2013 | Lira | 345/173 |

* cited by examiner

*Primary Examiner* — Carol S Tsai
(74) *Attorney, Agent, or Firm* — Novak Druce Connolly Bove + Quigg LLP

(57) ABSTRACT

An electronic device includes a display, an acceleration sensor, and a processing unit. The acceleration sensor detects displacement information of the electronic device. The processing unit compares the displacement information with an initial orientation information of the electronic device to determine directional movement of the electronic device. The processing unit shifts content of a display of the electronic device according to the directional movement.

7 Claims, 4 Drawing Sheets

ELECTRONIC DEVICE AND DISPLAY ADJUSTMENT METHOD

BACKGROUND

1. Technical Field

The present disclosure relates to an electronic device and a display adjustment method.

2. Description of Related Art

Users commonly read e-books in various formats on electronic devices, such as mobile phones, notebook computers, e-book readers, for example. However, it is difficult for users to hold their electronic devices completely steady, and so they may suffer eye fatigue. Therefore, there is a room for improvement in the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
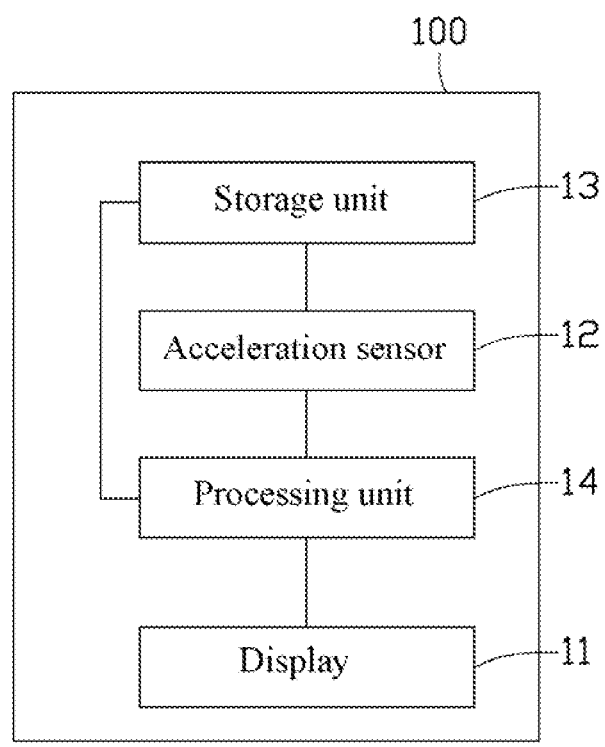
FIG. 1 is a block diagram of an electronic device, according to an exemplary embodiment.

FIG. 1 is a block diagram of an electronic device 100, according to an exemplary embodiment. The electronic device 100 includes a display 11, an acceleration sensor 12, a storage unit 13, and a processing unit 14. The electronic device 100 may be a mobile phone, a notebook computer, or an e-book reader, for example.

The display 11 can be used to view e-books, among other files, in various formats. In one embodiment, the display 11 can be a touch panel (e.g., capacitive or resistive).

The acceleration sensor 12 is electronically connected to the processing unit 14. The acceleration sensor 12 is used to detect displacement information of the electronic device 100, and send the displacement information to the processing unit 14. The displacement information can include slight up and down and side to side movements of the electronic device 100, such as those that might occur when a user is holding the device 100.

The storage unit 13 may be a random access memory, or a read-only memory, for example. The storage unit 13 is connected to the acceleration sensor 12, and is used to storage an initial orientation information of the electronic device 100, i.e. a baseline position of the device 100 to set an origin from which displacement will be gauged according to XY axes.

When the user starts the electronic device 100, the acceleration sensor 12 detects the initial orientation information of the electronic device 100.

Figure 2:
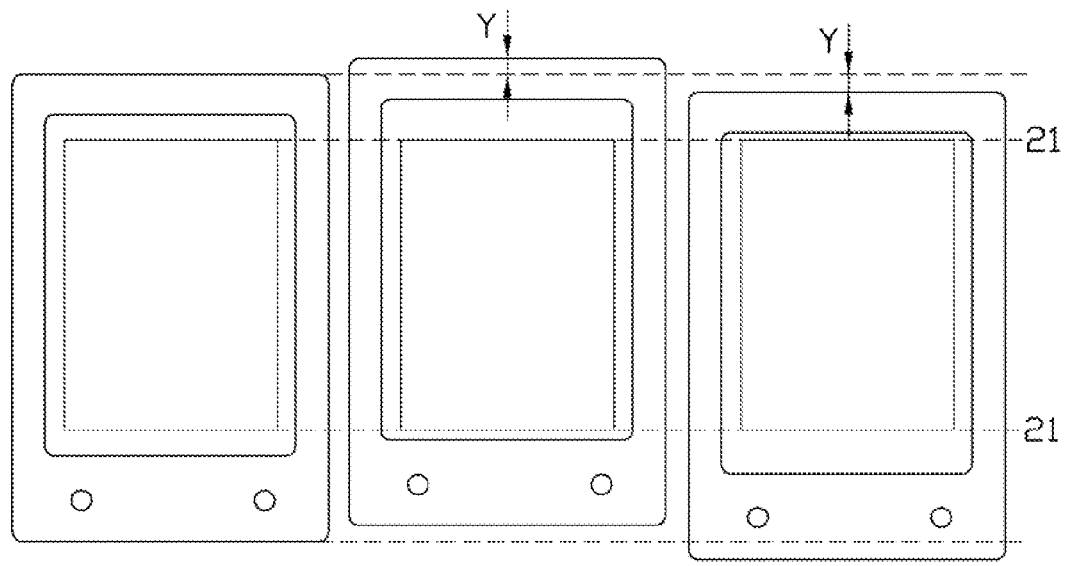
FIG. 2 is a schematic view showing shifting display content of the electronic device of FIG. 1, when the electronic device is moved up and down.

Referring to FIG. 2, the processing unit 14 is electronically connected to the display 11 and the storage unit 13. The acceleration sensor 12 continuously detects and sends displacement information of the electronic device 100 to the processing unit 14, and the processing unit 14 compares the displacement information with the origin to determine whether the electronic device 100 has been displaced. If the device 100 is not displaced (e.g., not moved), or displaced within a predefined range, such as 1 millimeter, for example, the display 11 continues to display content as-is without any adjustment. If displacement of the device 100 falls outside the predefined range, the processing unit 14 determines how the content of the display 11 should be shifted in the viewing area of the display 11 to compensate for the displacement. The processing unit 14 determines directional movement of the content in relation to the displacement to determine how the content should be shifted in the viewing area of the display 11. The directional movement includes a distance in the shift of the contents in the viewing area of the display 11 along an axis of the display 11 (e.g., how much and how far the contents should be shifted along an axis of the display 11 relative to the displacement). Then, the processing unit 14 adjusts position of the content on the display 11 accordingly. For example, when the processing unit 14 determines that the device 100 shifts up 4 centimeters along the X-axis of the display 11, the processing unit 14 cause the content of the display 11 to shift −4 centimeters along the X-axis, so that the content remains in an original position relative to a gaze of a user.

Figure 3:
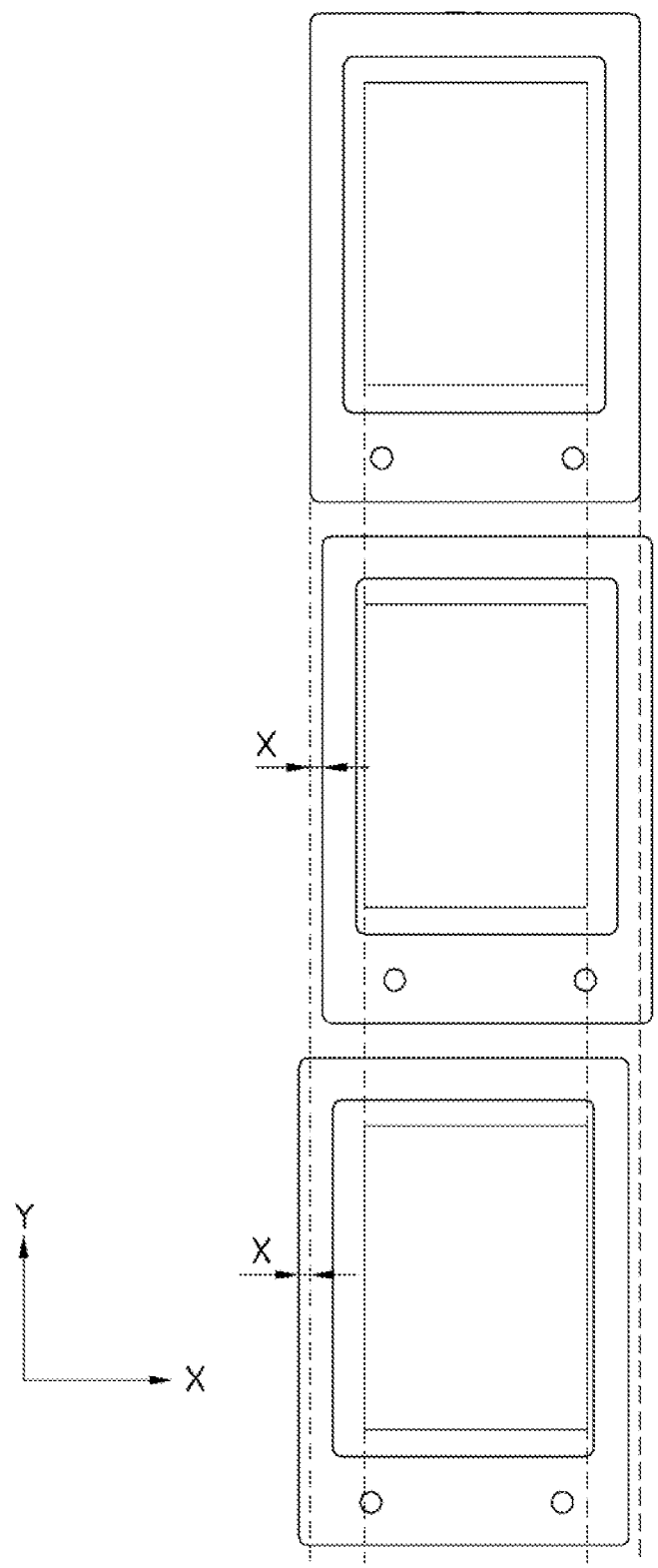
FIG. 3 is similar to FIG. 2, but the electronic device is moved side to side.

FIG. 2 and FIG. 3 are schematic views showing shifting display content of the electronic device 100, when the electronic device 100 is moved up and down (FIG. 2), or moved side to side (FIG. 3). No matter how the electronic device 100 moves, the content of the display 11 can remain in an original position relative to a gaze of a user, and be comfortable for viewing. For example, if the electronic device 100 is moved down along the Y-axis of the display 11 a number of centimeters, then from FIG. 2 we can see that the content of the display 11 are shifted in the opposite direction in compensation to remain in an area between two broken lines 21.

Figure 4:
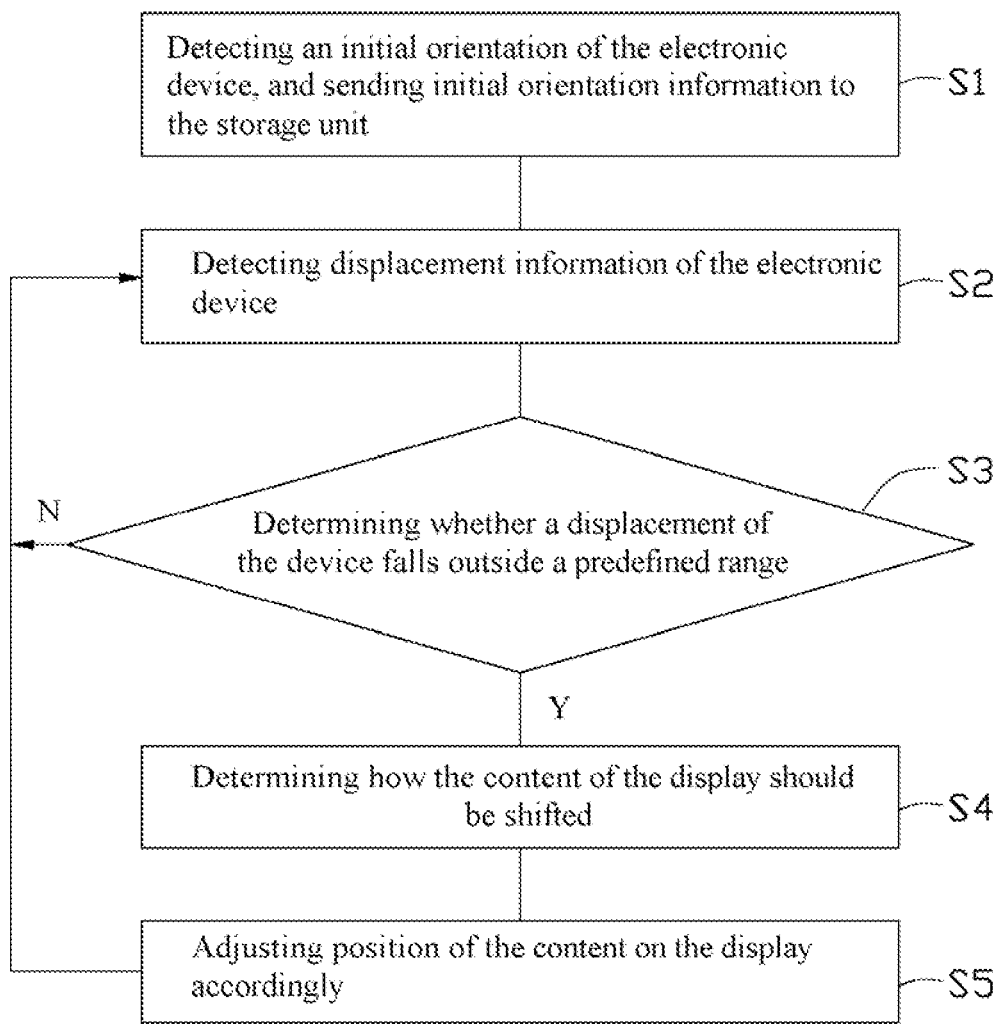
FIG. 4 is a flowchart of an embodiment of a display adjustment method.

FIG. 4 is a flowchart of an embodiment of a display adjustment method for the electronic device 100. Depending on the embodiment, certain of the steps described may be removed, others many be added, and the sequence of the steps may be altered. It is also to be understood that the description and the claims drawn to a method may include some indication in reference to certain steps. However, the indication used is only to be viewed for identification purposes and not as a suggestion as to an order for the steps. The method includes the following steps.

In step 1, the acceleration sensor 12 detects an initial orientation information of the electronic device 100, and sends the initial orientation information to the storage unit 13.

In step 2, the acceleration sensor 12 continuously detects displacement information of the electronic device 100, and sends the displacement information to the processing unit 14.

In step 3, the processing unit 14 compares the displacement information with the initial orientation information to determine whether the device 100 has been displaced.

If the device 100 is not displaced, or a displacement of the device 100 is within a predefined range, such as 1 millimeter, for example, the flow moves back to step 2. If a displacement of the device 100 falls outside the predefined range, step 4 is implemented.

In step 4, the processing unit 14 determines how the content of the display 11 should be shifted in the viewing area of the display 11 to compensate for the displacement.

In step 5, the processing unit 14 adjusts position of the content on the display 11 accordingly, and the flow moves back to step 2, thereby the content of the display 11 remains in the original position relative to a gaze of a user.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. An electronic device, comprising:
   a display;
   an acceleration sensor that detects an initial orientation information of the electronic device and a displacement information of the electronic device when the electronic device is used; and
   a processing unit electronically connected to the acceleration sensor, wherein the processing unit compares the displacement information with the initial orientation information to determine directional movement of content of the display relative to the displacement, and adjust position of the content on the display according to the directional movement in an opposite direction of the displacement of the electronic device such that the content of the display remains in an original position.

2. The electronic device of claim 1, wherein the directional movement of content of the display includes direction and distance of a shift of the content on the display.

3. The electronic device of claim 1, wherein the displacement information includes up and down and side to side movements of the electronic device.

4. The electronic device of claim 1, wherein the initial orientation information is a baseline position of the electronic device.

5. A display adjustment method for adjusting content displayed on a display of an electronic device comprising an acceleration sensor, the method comprising:
   detecting an initial orientation information of the electronic device by the acceleration sensor;
   detecting displacement information of the electronic device by the acceleration sensor;
   comparing the displacement information with the initial orientation information to determine whether the device has been displaced;
   if the displacement of the electronic device falls outside a predefined range, determining how the content of the display should be shifted to compensate for the displacement;
   adjusting the content displayed in an opposite direction of the displacement of the electronic device, thereby making the content remain in an original position.

6. The method of claim 5, further including feedbacking to step of detecting the displacement information of the electronic device, if the device is not displaced or a displacement is within the predefined range.

7. The method of claim 5, further including sending the initial orientation information to a storage unit before detecting the displacement information of the electronic device.

* * * * *